US007991424B2

(12) United States Patent
Batni et al.

(10) Patent No.: US 7,991,424 B2
(45) Date of Patent: Aug. 2, 2011

(54) DYNAMIC GENERATION OF GROUP LISTS FOR A COMMUNICATION DEVICE USING TAGS

(75) Inventors: Ramachendra P. Batni, Phoenix, AZ (US); Douglas W. Varney, Naperville, IL (US); Kumar V. Vemuri, Cambridge, MA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 769 days.

(21) Appl. No.: 12/036,714

(22) Filed: Feb. 25, 2008

(65) Prior Publication Data

US 2009/0215486 A1 Aug. 27, 2009

(51) Int. Cl.
*H04M 1/00* (2006.01)
(52) U.S. Cl. ............... 455/550.1; 455/466; 455/416; 455/518; 455/519; 455/563; 340/573.1
(58) Field of Classification Search ............... 455/550.1, 455/466, 416, 518, 519, 563, 414.1; 340/573.1
See application file for complete search history.

(56) References Cited

U.S. PATENT DOCUMENTS

| 7,251,495 | B2 * | 7/2007 | Keyani et al. | 455/466 |
| 7,733,232 | B2 * | 6/2010 | Light et al. | 340/573.1 |
| 7,800,507 | B2 * | 9/2010 | Light et al. | 340/573.1 |
| 2007/0290787 | A1 * | 12/2007 | Fiatal et al. | 340/2.1 |
| 2008/0001717 | A1 * | 1/2008 | Fiatal | 340/10.3 |

* cited by examiner

*Primary Examiner* — Sanh D Phu
(74) *Attorney, Agent, or Firm* — Duft Bornsen & Fishman LLP

(57) ABSTRACT

Systems and methods are described for dynamically generating one or more group lists as a sub-group of the contact list by assigning tags to contacts in a contact list. A user may define one or more tags for contacts in the contact list to generate a tag list in addition to the contact list. The tags indicate additional attributes of the contact that cannot be included in the contact list. To dynamically generate the group list, the user enters list criteria, and the tag list is searched to identify which of the contacts in the contact list has tags that match the list criteria. The contacts having tags that match the list criteria are combined into a group list which the user may then access to initiate communication with those contacts, or store for later use.

20 Claims, 10 Drawing Sheets

DYNAMIC GENERATION OF GROUP LISTS FOR A COMMUNICATION DEVICE USING TAGS

BACKGROUND OF THE INVENTION

1. Field of the Invention

The invention is related to the field of communication networks and contact lists generated for use in communication networks. In particular, in addition to static contact lists, group lists may be dynamically generated using tags that define additional attributes of one or more contacts in the contact list.

2. Statement of the Problem

A user of a communication device (or handset, such as a cellular phone) is commonly able to define a contact list for use in placing calls, sending text messages, sending emails, etc. The contact list includes a plurality of contacts, which may be people, businesses, etc, that are defined by the user and available to the user to initiate communication. An entry in the contact list typically includes a contact identifier, which may be a real name, a nickname, a photograph, an email address, etc, of a contact (e.g., a person or entity). The entry also typically includes contact information, such as one or more telephone numbers (i.e., a home number, a mobile number, a business number, etc), an email address, a URL, etc. When the user of the communication device wants to communicate with a contact on his/her contact list, the user may select that contact from the list and initiate communication without having to re-enter the telephone number or other information into the device.

A contact list may be stored on the device or in a network server. When the contact list is stored on the device, a memory element stores the contact list and the list is usually only available to the user when operating the device. When the contact list is stored on a network server, the contact list is generally part of a network address book service offered by the service provider. A network address book allows a user to add people to the contact list much like the contact list on a communication device. The network address book may also provide a network presence for contacts in the contact list. The network presence indicates the status of a party or the communication capabilities of the party for communicating. The network presence for a party may include the device or devices of the party, such as a cell phone, a PDA, etc. The network presence may further include services subscribed to or available to the party, such as Instant Messaging (IM), Push-to-Talk over Cellular (PoC), email, etc. The network presence may further include the status of the party, such as mood, location, etc. Because the network address book is stored on the network in a centralized server, the address book is available to applications on multiple devices of the user, such as a cell phone, a PDA, a laptop computer, etc.

The contact lists are generated by a user entering each individual contact into the list. The contact lists are defined by file format standards, so the information that may be stored in the contact lists is limited to the applicable standard. For example, vCard is a file format standard for electronic business cards, which may be adopted for contact lists. The vCard format allows for a name, an address, a phone number(s), a URL(s), a logo, a photograph, etc. Unfortunately, because the format of the contact list is defined by the standards, the user is very much limited as to what type of information may be stored for each contact. A user may want to include additional personal information with his/her contacts, but is not able to because of the standardized format of the contact list. It would be desirable to give users the ability to store additional information about contacts that is not allowed by standardized formats.

Another present limitation of contact lists is that the list is merely a collection of information entered by the user or a representative of the user, such as a company administrator for a user's company contact list. If a user would like to identify contacts that share common attributes or interests, the user would have to manually search through the contacts one by one to identify these contacts. It would be desirable to give users the ability to dynamically generate sub-groups of the contact list that share common attributes instead of merely relying on the overall contact list.

SUMMARY OF SOLUTION

Embodiments of the invention solve the above and other related problems by allowing a user to dynamically generate one or more group lists as a sub-group of the contact list by assigning tags to contacts in a contact list. A tag comprises any type of numbers, letters, strings, etc, that define an additional attribute of a contact in the contact list. For example, a tag may be "FRIEND" or "GOLFER" which further define an attribute or personal attribute of a contact. The tags are stored outside of the standardized format of the contact list, so any number of tags may be assigned to a contact and the number of tags is not limited by a standardized format. Furthermore, the number of attributes assigned to contacts may vary. A user may then dynamically generate a group list (as a sub-group of the contact list) by entering one or more tags as list criteria for selecting members of the group. The contacts having tags matching the list criteria are then identified to generate the group list. The user can thus dynamically generate group lists from his/her contact lists, such as a "FRIEND" group list or a "GOLFER" group list. The user may then initiate communication with one or more of the contacts in the group list as desired. This concept of generating group lists advantageously allows a user to quickly identify contacts sharing a common attribute without having to manually identify the contacts from the contact list individually.

One embodiment of the invention comprises group list system that is operable to dynamically generate a group list for use by a communication device. The group list system receives list criteria from a user of the communication device. The list criteria represent the type of group list the user wants to generate. The group list system identifies a contact list defined by the user. The contact list includes a plurality of contacts that include a contact identifier and associated contact information that is formatted as defined by a file format standard. The group list system also identifies a tag list corresponding with the contacts in the contact list. The tag list includes one or more tags that relate to a contact in the contact list. The group list system then searches the tag list to identify one or more contacts having a tag or tags that match the list criteria entered by the user. The group list system then generates a group list based on the contact(s) identified in the tag list, and provides the group list to the user. The user may then initiate communication with one or more of the contacts in the group list as desired. Alternatively, the user may store the group list for future use on the communication device or on a network server. The stored group list may subsequently be used for communication with one or more of the contacts in the group list.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-11 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
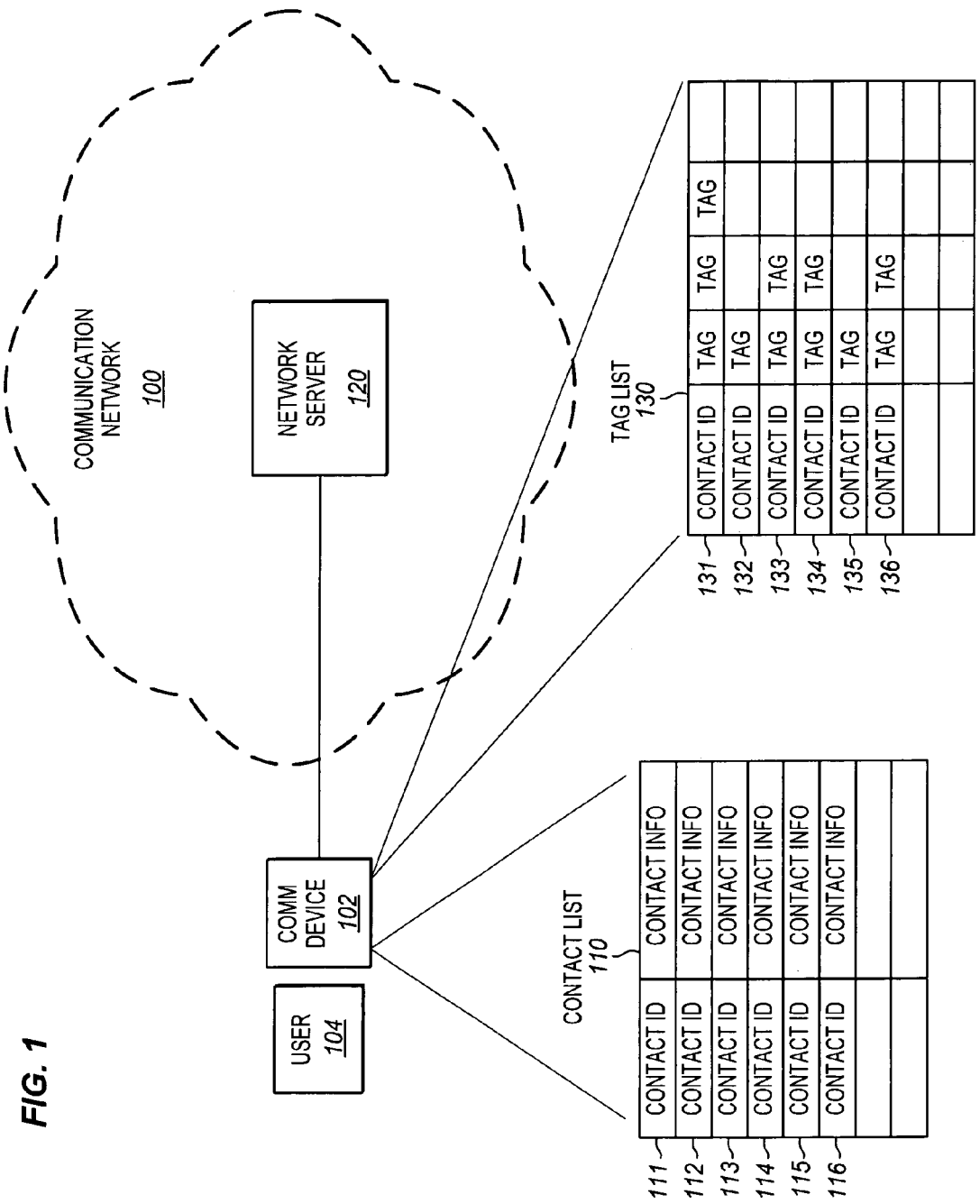
FIG. 1 illustrates a communication network in an exemplary embodiment of the invention.

FIG. 1 illustrates a communication network 100 in an exemplary embodiment of the invention. Communication network 100 is operable to provide a voice communication service and/or a data communication service to communication devices, such as communication device 102. Communication network 100 may comprise a cellular network, an IMS network, an IP network, or another type of network. Communication device 102 comprises any type of device operable to exchange signaling and/or bearer communications with communication network 100 to provide voice and/or data communications to a user 104. Communication device 102 may comprise a mobile device, such as a cellular phone, a PDA, etc, or may comprise a non-mobile device, such as a wireline phone or a PC.

Communication device 102 is also operable to provide a contact list 110 to user 104 through an appropriate application running on communication device 102. A contact list comprises any type of data structure that stores information on one or more contacts as defined by user 104 to allow a user 104 to initiate a communication with the contacts. The communication may comprise a voice call, a text message, an email message, etc. A contact may be a person, a business, or another type of entity.

As illustrated in FIG. 1, contact list 110 includes a plurality of contacts 111-116 as entries in the data structure. Each contact 111-116 includes a contact identifier (contact ID) and contact information (contact info). A contact identifier may be a real name, a nickname, a photograph, an email address, etc. Contact information may comprise one or more telephone numbers (i.e., a home number, a mobile number, a business number, etc), an email address, a URL, etc. Contact list 110 is formatted as defined by a file format standard. Thus, the fields of contact list 110 are statically defined according to the file format standard. User 104 may maintain one or more contact lists, each of which may be identified by a contact list name.

Contact list 110 may be stored and maintained locally in a memory in communication device 102. In another embodiment, contact list 110 may be stored and maintained in a network server 120. Network server 120 comprises any system operable to store and maintain contact list 110. Network server 120 may be referred to as network address book server, a presence server, or a group list server.

In addition to the contact list 110, a tag list 130 is also maintained for user 104 according to the embodiments described herein. A tag list comprises any type of data structure that stores one or more tags that relate to one or more contacts 111-116 in contact list 110. Each entry 131-136 in tag list 130 includes a contact identifier for a contact 111-116 (or some other data relating to a contact 111-116 in contact list 110), and one or more tags defined for that contact 111-116. A tag comprises any type of numbers, letters, strings, etc, that define an additional attribute of a contact in contact list 110. A tag typically includes some type of personal attribute of a contact 111-116. For example, a tag may be "FRIEND" or "GOLFER", which are both personal attributes that additionally characterize a contact 111-116 in contact list 110. User 104 may maintain one or more tag lists, each of which can be identified by a tag list name.

Because contact list 110 has a standardized format, there are no fields that allow for personal attributes such as this. Thus, the tags are defined to include these personal attributes of the contacts 111-116. Tag list 130 does not conform to the same standardized format as contact list 110 (or another standardized format), so any number of tags may be assigned to a contact 111-116 and the number of tags is not limited by a standardized format.

Tag list 130 may be stored and maintained locally in a memory in communication device 102. In another embodiment, tag list 130 may be stored and maintained in network server 120 or another network server.

Figure 2:
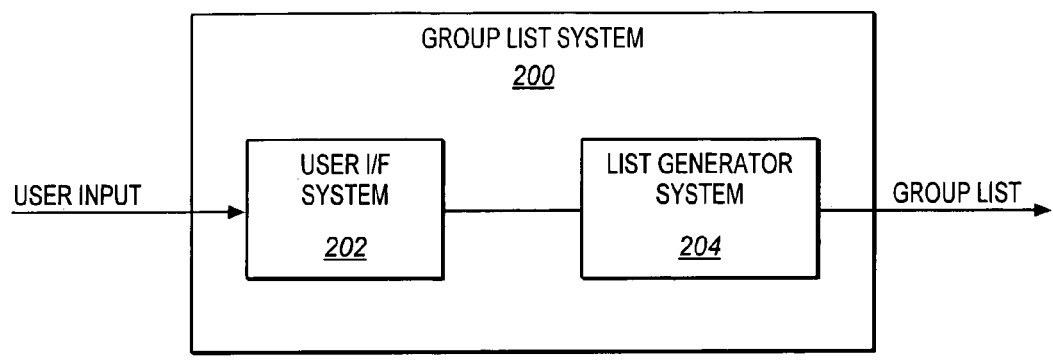
FIG. 2 illustrates a group list system adapted to generate group lists in an exemplary embodiment of the invention.

FIG. 2 illustrates a group list system 200 adapted to generate group lists in an exemplary embodiment of the invention. Group list system 200 includes a user interface system 202 and a list generator system 204. User interface 202 is operable to generate messages that are displayed to user 104, and to receive input from user 104 in order to generate the group lists. User interface 202 may display information to user 104 and receive input from user 104 through communication device 102 or through another system, such as a PC. List generator system 204 is operable to generate group lists responsive to input from user 104. Group list system 200 may be implemented in an appropriate processor and memory configuration, in a logic configuration, or in another configuration. Group list system 200 may be installed in communication device 102, in network server 120, or on some other server.

Figure 3:
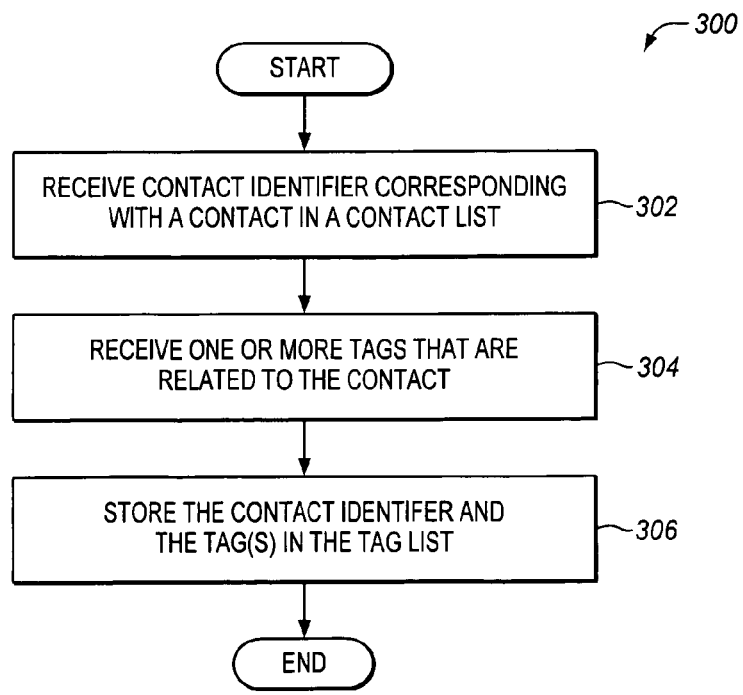
FIG. 3 is a flow chart illustrating a method of generating a tag list in an exemplary embodiment of the invention.

Before group lists may be generated, user 104 (or potentially another user) first creates tag list 130 (see FIG. 1) and defines the tags in tag list 130. FIG. 3 is a flow chart illustrating a method 300 of generating tag list 130 in an exemplary embodiment of the invention. The steps of method 300 will be described with reference to communication network 100 in FIG. 1 and group list system 200 in FIG. 2. The steps of the flow chart in FIG. 3 are not all inclusive and may include other steps not shown.

The tags in tag list 130 relate to contacts 111-116 in contact list 110. Thus, user 104 defines the tags for one or more of the contacts 111-116 in contact list 110 as desired. For example, user 104 may first select contact 111 in contact list 110, or enter a contact identifier for contact 111. Again, the contact identifier may be a real name, a nickname, an email address, etc. User 104 may then define one or more tags for contact 111. User 104 may enter the contact identifier and the tag(s) into communication device 102, which transmits this information to group list system 200. Alternatively, user 104 may enter the contact identifier and the tag(s) into a web site or portal, through a PC or similarly-enabled system, which provides this information to group list system 200.

In step 302 of method 300, user interface system 202 receives the contact identifier corresponding with a contact 111-116 in contact list 110 as entered or selected by user 104. User interface system 202 also receives one or more tags that are related to the contact 111-116 as entered by user 104 in step 304. List generator system 204 then stores the contact identifier and the tag(s) in the tag list 130 for user 104 in step 306. List generator system 204 may store the contact identifier and the tag(s) according to any desired database techniques.

User 104 may then select another contact 112 in contact list 110, or enter a contact identifier for contact 112. User 104 may then define one or more tags for contact 112. This process continues for other contacts 111-116 in contact list 110 as desired to populate tag list 130.

User 104 may be free to define the tags as he/she desires. For example, one user may like the tag "FRIEND" while another user likes the tag "BUDDY". In other embodiments, the service provider operating network 100 may provide guidelines for the tags, or at least some popular tags. This may add some symmetry to the different tag lists of different users.

Figure 4:
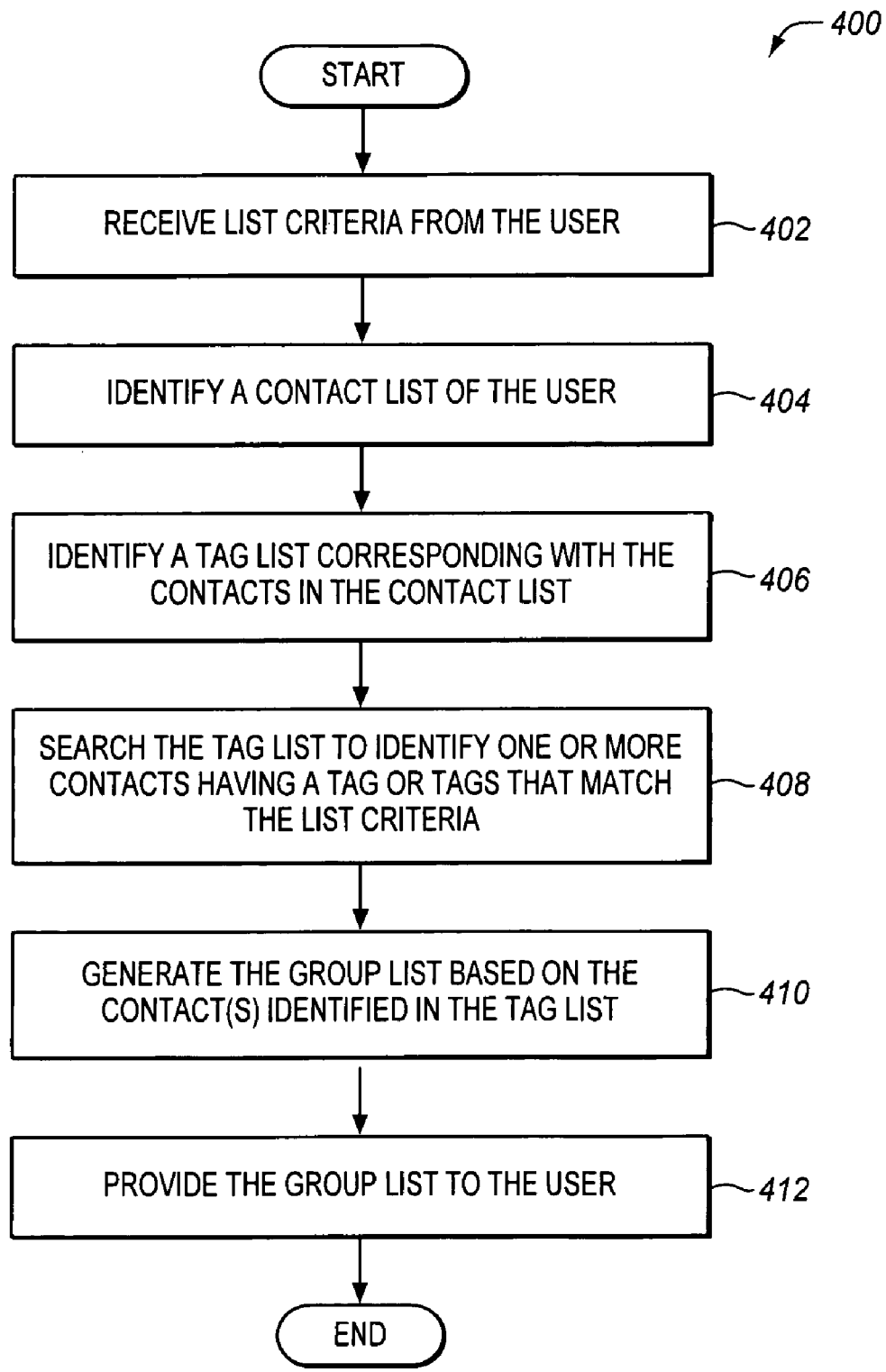
FIG. 4 is a flow chart illustrating a method of dynamically generating a group list in an exemplary embodiment of the invention.

After tag list 130 is populated, the information stored in tag list 130 may be used to dynamically generate the group lists for user 104. FIG. 4 is a flow chart illustrating a method 400 of dynamically generating a group list in an exemplary embodiment of the invention. The steps of method 400 will be described with reference to communication network 100 in FIG. 1 and group list system 200 in FIG. 2. The steps of the flow chart in FIG. 4 are not all inclusive and may include other steps not shown.

In order to generate a group list, user 104 first enters list criteria to define what type of group list he/she would like to generate. For instance, the list criteria may be "FRIEND" or "GOLFER". The list criteria should match one or more of the tags previously defined for the contacts 111-116 in the contacts list 110. User 104 enters the list criteria along with the appropriate logic. For instance, user 104 may enter "FRIEND" AND "GOLFER" in order to generate a group list that includes friends of user 104 who play golf. Alternatively, user 104 may enter "FRIEND" OR "GOLFER" to generate a list that includes contacts who are either tagged as "FRIEND" or "GOLFER" or both. User 104 may also enter the name of the contact list and tag list to be used for this search.

In step 402 of method 400, user interface system 202 receives the list criteria from user 104. In step 404, list generator system 204 identifies contact list 110 of user 104, which may be identified by name by user 104. In step 406, list generator system 204 identifies tag list 130, which may also be identified by name by user 104. In step 408, list generator system 204 searches tag list 130 to identify one or more contacts 111-116 having a tag or tags that match the list criteria entered by user 104. In essence, list generator system 204 filters out the contacts 111-116 of contact list 110 that have tags matching the list criteria as defined in tag list 130. In step 410, list generator system 204 generates a group list based on the contact(s) identified in tag list 130. The group list thus represents the contacts 111-116 in contact list 110 that share common tags matching the list criteria.

In addition to searching tag list 130, list generator system 204 may search contact list 110 to identify one or more contacts 111-116 having contact information that matches the list criteria entered by user 104. List generator system 204 may generate the group list additionally based on the contact(s) identified in contact list 110. For example, user 104 may enter the list criteria of "FRIEND" along with a particular area code or zip code. Area codes and zip codes are typically included in the contact information in the contact list 110. Thus, list generator system 204 may search both the tag list 130 and the contact list 110 to generate the group list.

By entering particular list criteria, user 104 is advantageously able to identify which of the contacts 111-116 in contact list 110 matches the list criteria. Such functionality was not previously available due to the limited amount of information allowed in the contact list 110. However, by adding a tag list 130 that relates to the contacts 111-116 in the contact list 110, the tags provide additional information about the contacts 111-116 that may be used to generate group lists. List generator system 204 is thus able to search through the tags in the tag list 130 to identify the contacts 111-116 in contact list 110 having matching tags. These identified contacts 111-116 are then combined into a group list.

After the group list is generated, list generator system 204 provides the group list to user 104 in step 412. User 104 may then select one or more of the contacts 111-116 in the group list to initiate communication over communication network 1 00. For instance, user 104 may initiate a voice call one or more of the contacts 111-116 in the group list, may send a text message to one or more of the contacts 111-116 in the group list, may send an email to one or more of the contacts 111 -116 in the group list, etc.

User 104 may also have the option of storing the group list for later use. For example, user interface system 202 may query user 104 for a name for the group list, responsive to which user 104 enters a desired name. User interface system 202 receives the group name, and list generator system 204 stores the group list with the group name. List generator system 204 may store the group list, using a protocol such as XCAP, in a network-based address book, such as in network server 120. Alternatively, list generator system 204 may store the group list in communication device 102.

EXAMPLE

Figure 5:
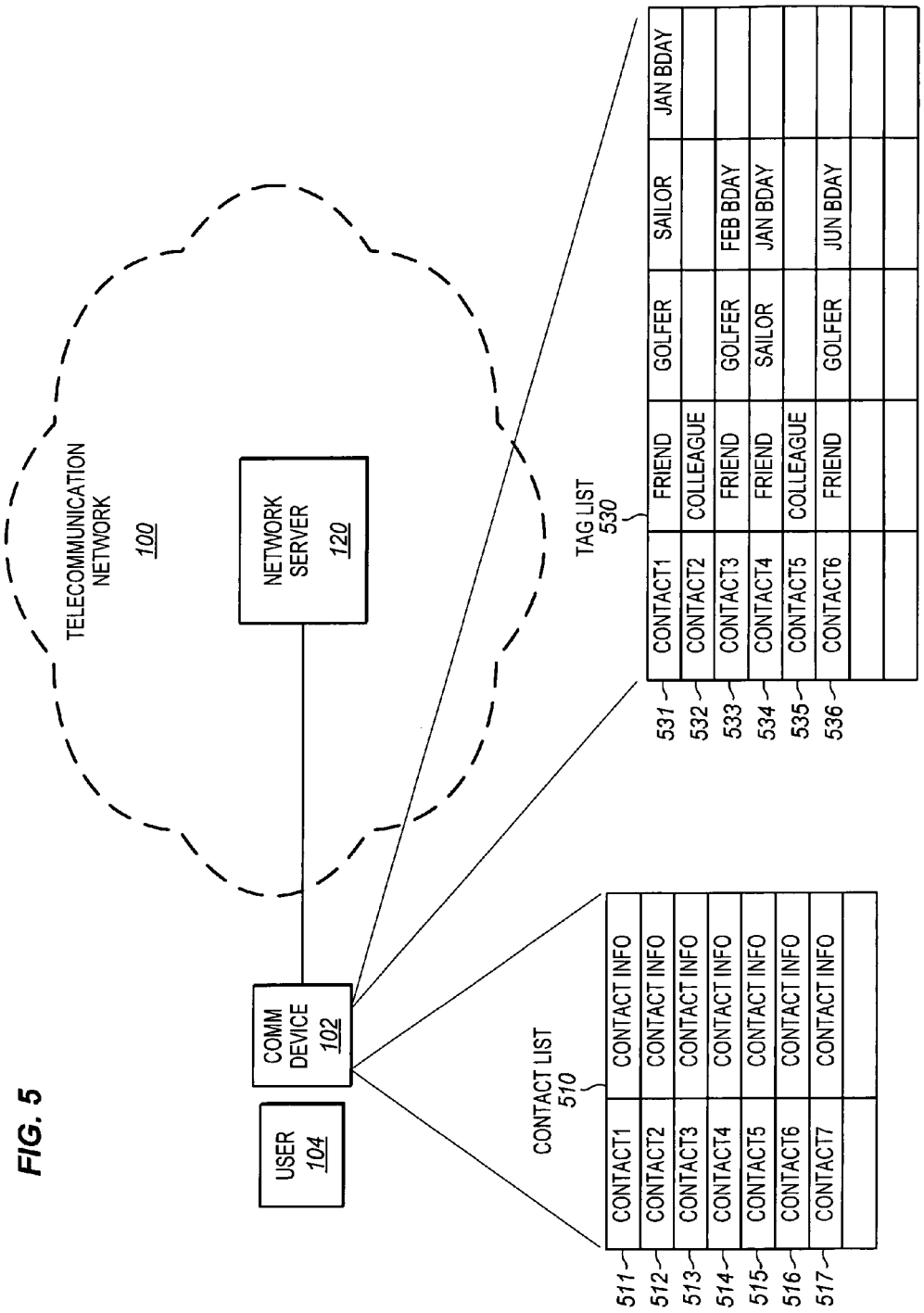
FIG. 5 illustrates a communication network in another exemplary embodiment of the invention.
Figure 6:
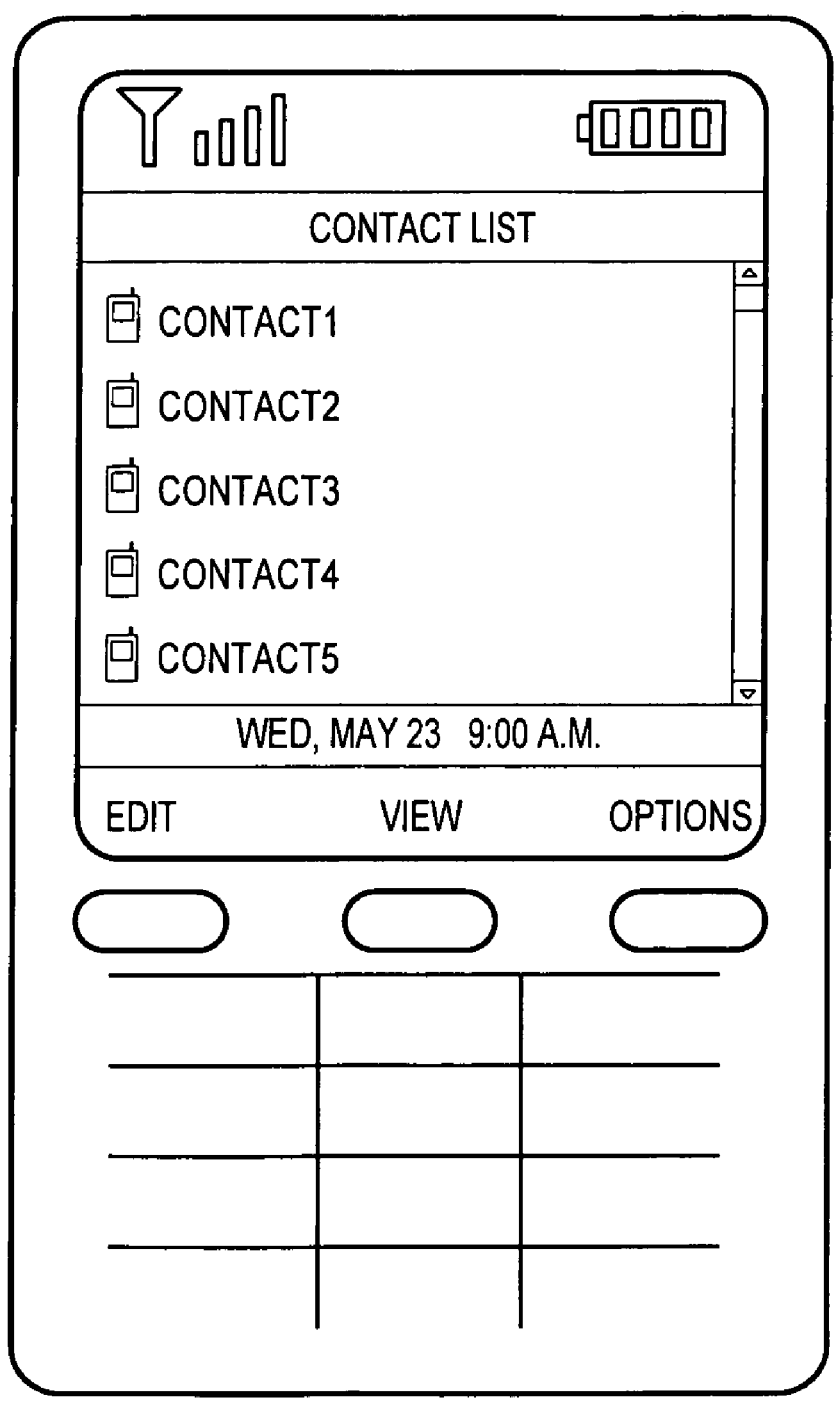
FIG. 6 illustrates a user interface provided through a communication device to display a contact list to a user in an exemplary embodiment of the invention.

FIGS. 5-11 illustrate an example of dynamically generating group lists. FIG. 5 illustrates communication network 100 in another exemplary embodiment of the invention. As in FIG. 1, communication device 102 is operable to provide a contact list 510 to user 104. Contact list 510 includes a plurality of contacts 511-517 as entries with each contact 511-517 including a contact identifier and contact information. Contact list 510 is formatted as defined by a file format standard. FIG. 6 illustrates a user interface provided through communication device 102 to display contact list 510 to user 104 in an exemplary embodiment of the invention. In FIG. 6, user 104 has navigated to the proper screen in order to display contact list 510. From this screen, user 104 may select one or more of the contacts and initiate communication.

In addition to the contact list 510, a tag list 530 is also maintained for user 104. User 104 generates tag list 530 to include personal attributes that additionally characterize one or more contacts 511-517 in contact list 510. Because contact list 510 has a standardized format, there are no fields that allow for personal attributes such as this. Thus, the tags are defined to include these personal attributes of the contacts 511-517. Tag list 530 does not conform to the same standardized format as contact list 510 (or another standardized format), so any number of tags may be assigned to a contact 511-517 and the number of tags is not limited by a standardized format. Not all contacts 511-517 need be assigned tags in tag list 130.

Figure 7:
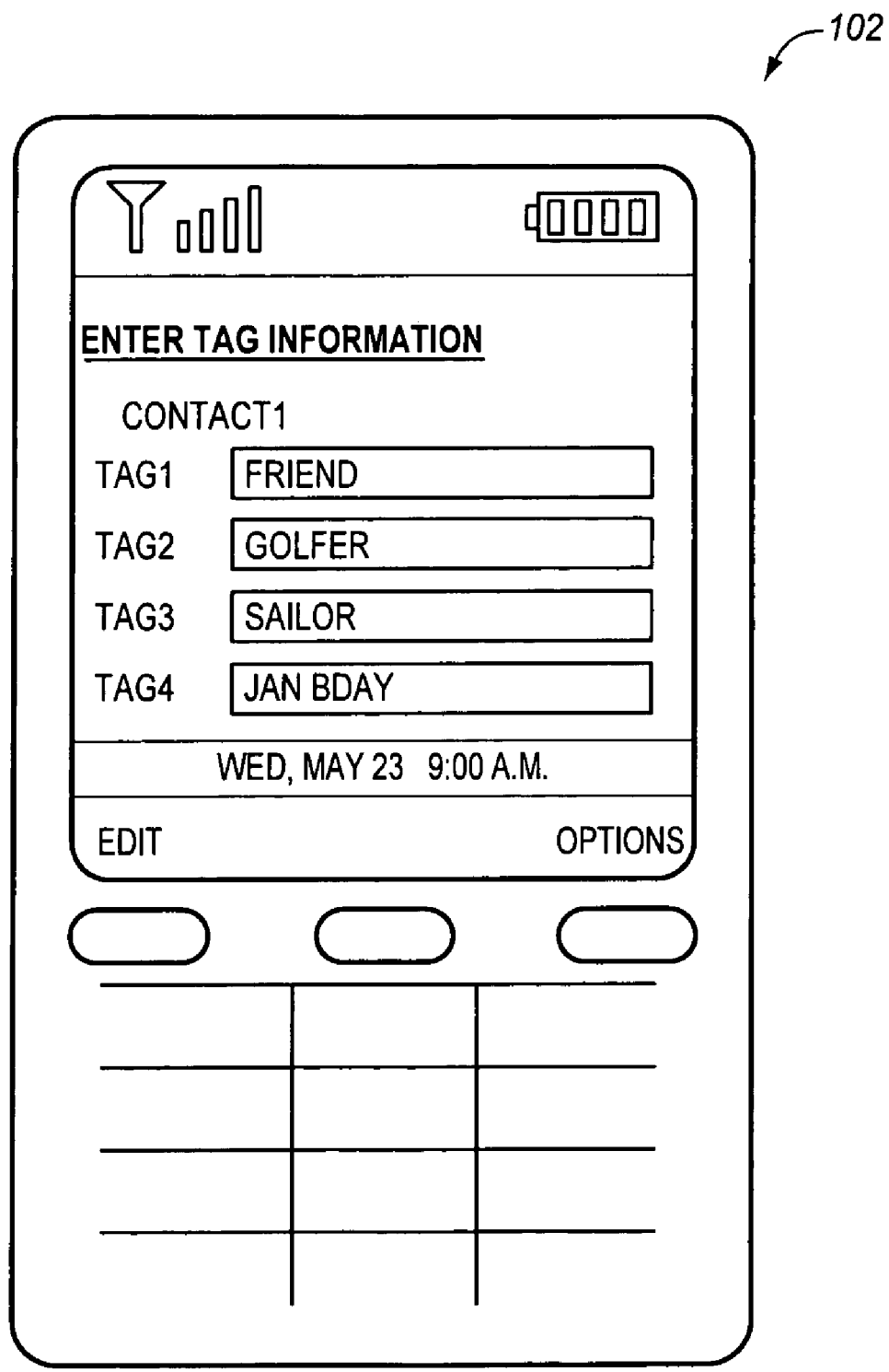
FIG. 7 illustrates a user interface provided through a communication device to enter tag information in an exemplary embodiment of the invention.

Tag list 530 includes entries 531-536. Each entry 531-536 includes a contact identifier, such as "CONTACT" in entry 531, and one or more tags. For instance, the tags defined for "CONTACT1" are "FRIEND", "GOLFER", "SAILOR", and "JAN BDAY". User 104 may define however many tags he/she wants for each contact 511-517 in contact list 510, and some contacts 511-517 may have no tags defined. User 104 may enter the tag information through a web site or portal through a PC, or may enter the tag information through communication device 102. FIG. 7 illustrates a user interface provided through communication device 102 to enter tag information in an exemplary embodiment of the invention. In FIG. 7, user 104 has navigated to the proper screen in order to enter tag information for contact 511 (CONTACT1). User 104 then enters the tags of "FRIEND", "GOLFER", "SAILOR", and "JAN BDAY". User 104 may enter additional tags for contact 511 as desired, or may switch to another contact 512-517 and enter tag information for that contact.

The tag information entered by user 104 is saved in tag list 530. User 104 may define multiple tag lists, so user 104 may assign a name to tag list 530. Those skilled in the art will appreciate that FIG. 5 is just one embodiment, and the entries 531-536 in tag list 530 may have more or different tags than those illustrated. Contact list 510 and tag list 530 may be stored locally in a memory in communication device 102. In another embodiment, contact list 510 and tag list 530 may be stored in network server 120. Although contact list 510 and tag list 530 may be stored within the same memory or server, these lists are separate data structures. They are separate data structures because contact list 510 has a standardized format while the tag list 530 does not conform to a standardized format.

Figure 8:
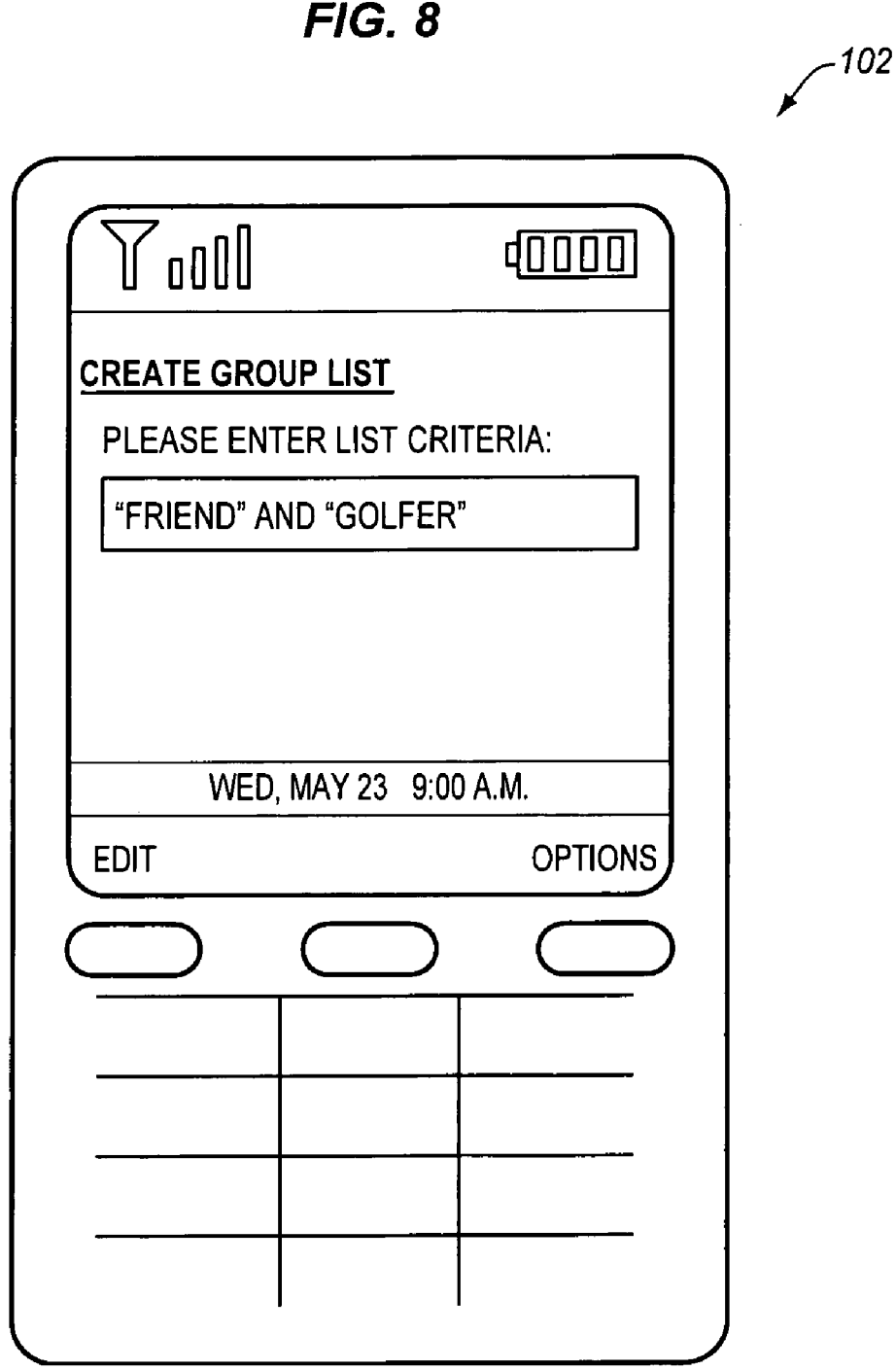
FIG. 8 illustrates a user interface provided through a communication device to enter list criteria for generating a group list in an exemplary embodiment of the invention.

After tag list 530 is populated, the information stored in tag list 530 may be used to dynamically generate group lists for user 104. In order to generate a group list, user 104 first enters list criteria to define what type of group list he/she would like to generate. Assume that user 104 wants to identify contacts 511-517 that are both friends and like to golf. FIG. 8 illustrates a user interface provided through communication device 102 to enter list criteria for generating a group list in an exemplary embodiment of the invention. User 104 is aware of what tags have been assigned within the tag list 530. Thus, to generate a desired group list, user navigates to the screen shown in FIG. 8 and enters list criteria as one or more tags and associated logic. In FIG. 8, user 104 has entered "FRIEND" AND "GOLFER" as the list criteria. Because user 104 may have multiple contact lists and tag lists, communication device 102 also allows for the user to specify which lists to use in generating the group list.

Responsive to user 104 entering the list criteria into device 102, user interface system 202 of group list system 200 (see FIG. 2) receives the list criteria from user 104. Group list system 200 may be implemented in device 102, or in network server 120. List generator system 204 then identifies contact list 510 of user 104, and also identifies tag list 530 defined by user 104. The name of contact list 510 and the name of tag list 530 may be provided by user 104.

Figure 9:
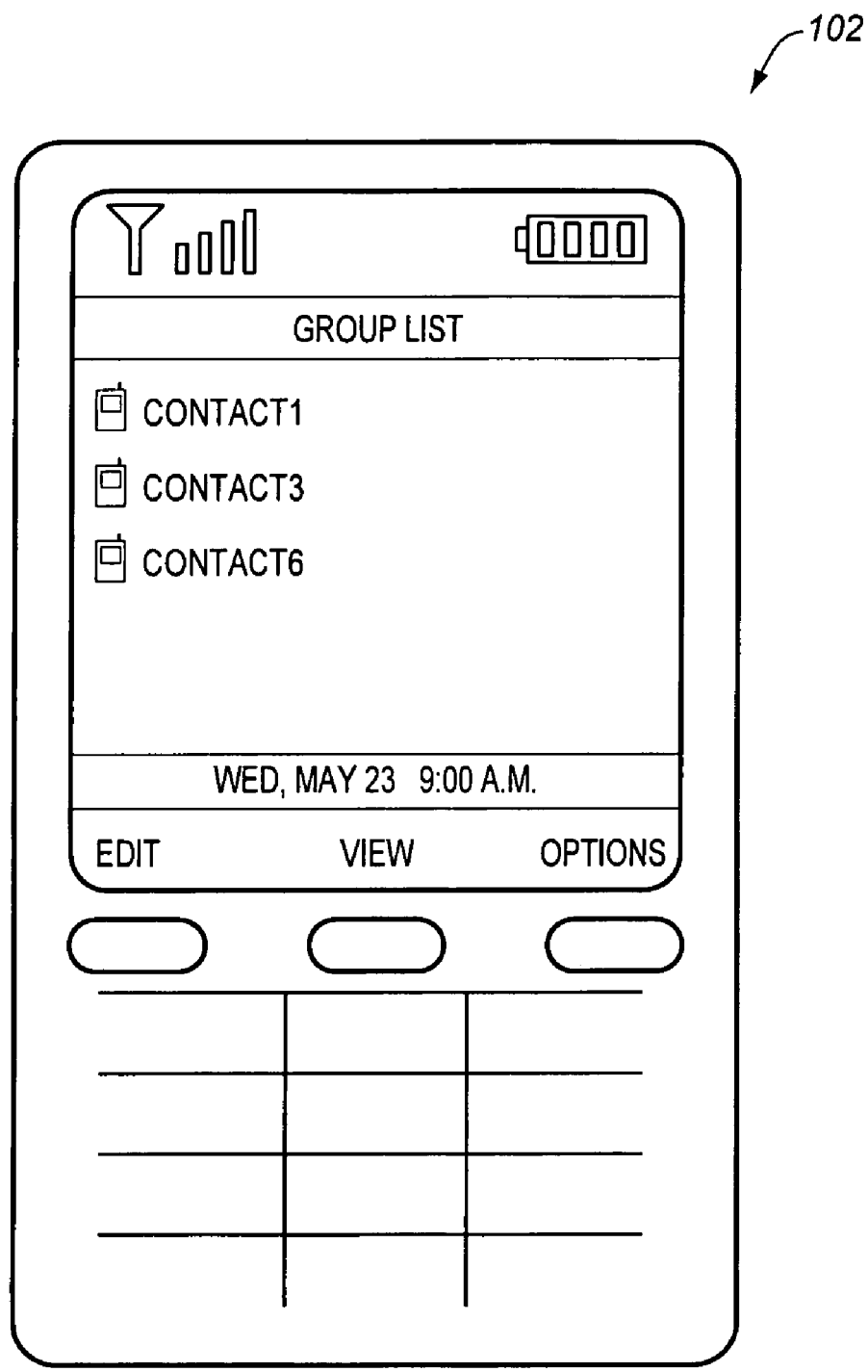
FIG. 9 illustrates a user interface provided through a communication device to display a group list in an exemplary embodiment of the invention.

List generator system 204 searches tag list 530 to identify one or more contacts having tags that match the list criteria entered by user 104. In this embodiment, there are three contacts that include the tags "FRIEND" AND "GOLFER", which are contact 511 (CONTACT1), contact 513 (CONTACT3), and contact 516 (CONTACT6). List generator system 204 then generates a group list based on the contacts identified in tag list 530. After the group list is generated, list generator system 204 provides the group list to device 102, which is in turn displayed to user 104. FIG. 9 illustrates a user interface provided through communication device 102 to display a group list in an exemplary embodiment of the invention. The list criteria and tag list 530 are used to filter out the contacts having common attributes and generate the group list. The number of contacts displayed in FIG. 9 is a sub-set or sub-group of the overall contact list 5 10. User 104 may then select one or more of the contacts in the group list to initiate communication.

User 104 may also have the option of storing the group list for later use. For example, user interface system 202 may query user 104 for a name for the group list, responsive to which user 104 enters a desired name. User interface system 202 receives the group name, and list generator system 204 stores the group list with the group name. List generator system 204 may store the group list in a network-based address book, such as in network server 120. Alternatively, list generator system 204 may store the group list in communication device 102. User 104 may then recall the group list as desired on this device or on a different device.

Figure 10:
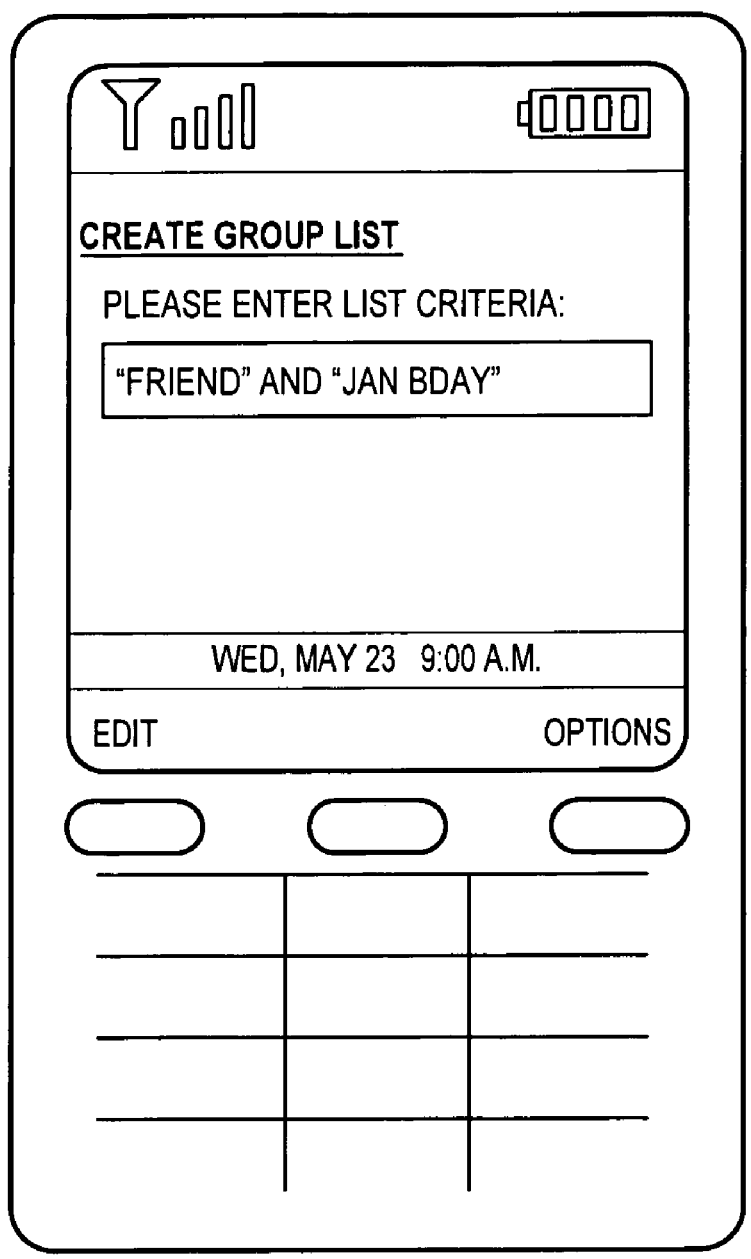
FIG. 10 illustrates a user interface provided through a communication device to enter list criteria for generating another group list in an exemplary embodiment of the invention.

Assume now that user 104 wants to generate another group list to identify contacts that are both friends and have a birthday in January. FIG. 10 illustrates a user interface provided through communication device 102 to enter list criteria for generating another group list in an exemplary embodiment of the invention. To generate this desired group list, user 104 navigates to the screen shown in FIG. 10 and enters list criteria as one or more tags and associated logic. In FIG. 10, user 104 has entered "FRIEND" AND "JAN BDAY" as the list criteria. User 104 may also provide the name of contact list 510 and the name of tag list 530.

Figure 11:
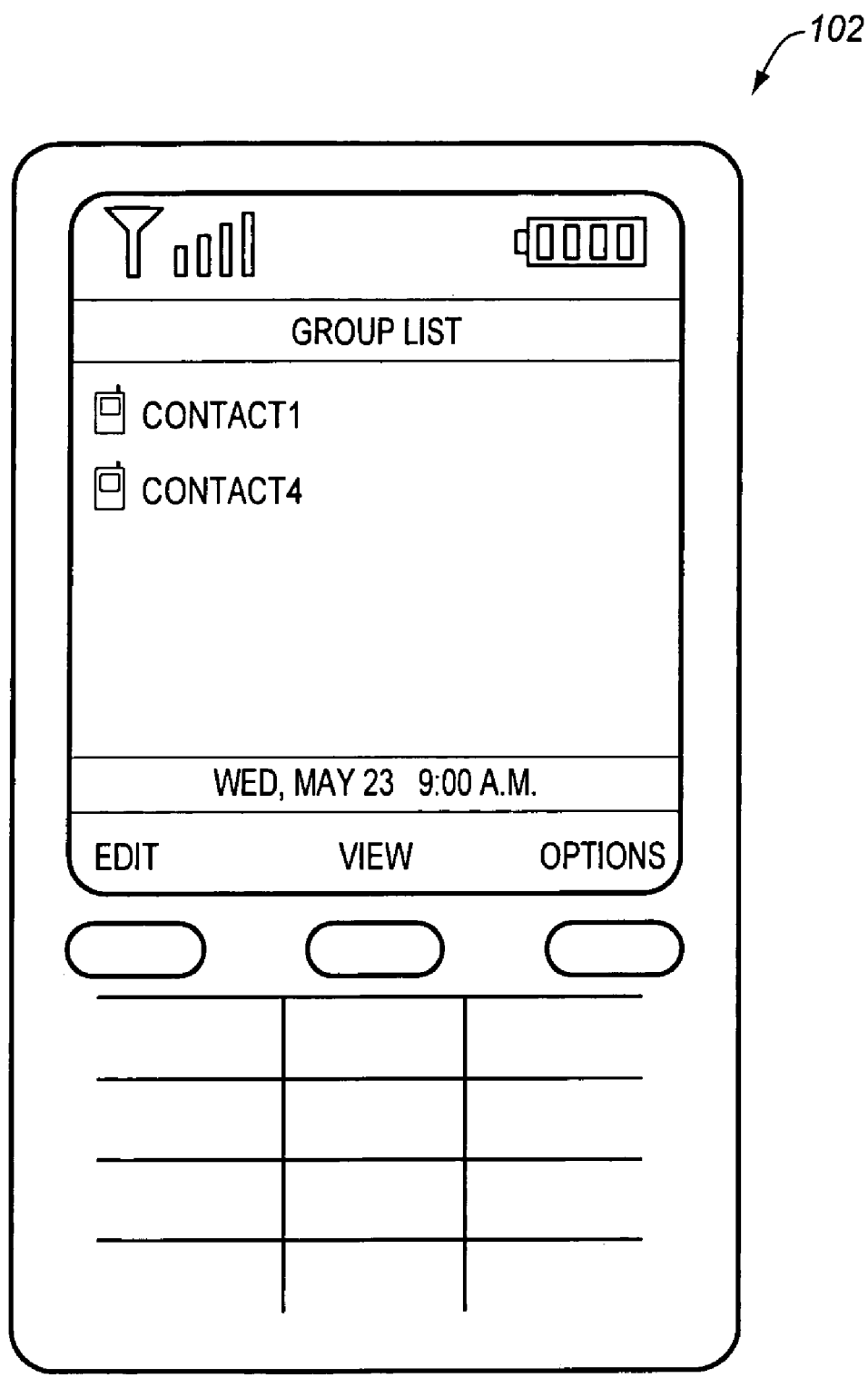
FIG. 11 illustrates a user interface provided through a communication device to display a group list in an exemplary embodiment of the invention.

Responsive to user 104 entering the list criteria and other related information into device 102, user interface system 202 of group list system 200 (see FIG. 2) receives the list criteria from user 104. List generator system 204 searches tag list 530 to identify one or more contacts having tags that match the list criteria entered by user 104. In this embodiment, there are two contacts that include the tags "FRIEND" AND "JAN BDAY", which are contact 511 (CONTACT1) and contact 514 (CONTACT4). List generator system 204 then generates a group list based on the contacts identified in tag list 530. After the group list is generated, list generator system 204 provides the group list to device 102, which is in turn displayed to user 104. FIG. 11 illustrates a user interface provided through communication device 102 to display a group list in an exemplary embodiment of the invention. User 104 may then select one or more of the contacts in the group list to initiate communication. User 104 may also store this group list for later use.

By assigning one or more tags to the contacts in contact list 510, user 104 is advantageously able to dynamically generate group lists on his/her communication device 102 by simply entering list criteria. User 104 may then quickly determine which contacts 511-517 in contact list 510 share common attributes. User 104 thus does not need to manually scan through contact list 510 and attempt to identify those contacts sharing common attributes, as the group list system 200 (see FIG. 2) can automatically perform this function for user 104.

Although specific embodiments were described herein, the scope of the invention is not limited to those specific embodiments. The scope of the invention is defined by the following claims and any equivalents thereof.

We claim:

1. A method of dynamically generating a group list for use by a communication device, the method comprising:
   receiving list criteria from a user of the communication device;
   identifying a contact list of the user of the communication device stored at a network based address book, wherein the contact list includes a plurality of contacts that include a contact identifier and associated contact information that is formatted as defined by a file format standard;
   identifying a tag list corresponding with the contacts in the contact list and stored at the communication device, wherein the tag list includes at least one tag that relates to a contact in the contact list;
   searching the tag list to identify at least one contact having a tag that matches the list criteria entered by the user; and
   generating a group list based on the at least one contact identified in the tag list.

2. The method of claim 1 further comprising:
   searching the contact list to identify at least one contact having contact information that matches the list criteria entered by the user; and
   generating the group list additionally based on the at least one contact identified in the contact list.

3. The method of claim 1 further comprising:
   receiving a group name from the user; and
   storing the group list with the group name.

4. The method of claim 3 wherein the group list is generated by and stored at a network server that hosts the network based address book.

5. The method of claim 3 wherein storing the group list with the group name further comprises:
   storing the group list in the communication device.

6. The method of claim 1 further comprising generating the tag list by:
   receiving a contact identifier corresponding with a contact in the contact list;
   receiving at least one tag that is related to the contact; and
   storing the contact identifier and the at least one tag as an entry in the tag list.

7. The method of claim 1 wherein the tag list is not formatted as defined by the file format standard.

8. A group list system operable to dynamically generate a group list for use by a communication device, the group list system comprising:
   a user interface system operable to receive list criteria from a user of the communication device; and
   a list generator system operable to:
      identify a contact list of the user of the communication device stored at a network based address book, wherein the contact list includes a plurality of contacts that include a contact identifier and associated contact information that is formatted as defined by a file format standard;
      identify a tag list corresponding with the contacts in the contact list and stored at the communication device, wherein the tag list includes at least one tag that relates to a contact in the contact list;
      search the tag list to identify at least one contact having a tag that matches the list criteria entered by the user; and
      generate a group list based on the at least one contact identified in the tag list.

9. The group list system of claim 8 wherein the list generator system is further operable to:
   search the contact list to identify at least one contact having contact information that matches the list criteria entered by the user; and
   generate the group list additionally based on the at least one contact identified in the contact list.

10. The group list system of claim 8 wherein:
    the user interface system is further operable to receive a group name from the user; and
    the list generator system is further operable to store the group list with the group name.

11. The group list system of claim 10 wherein the group list is generated by and stored at a network server that hosts the network based address book.

12. The group list system of claim 10 wherein the list generator system is further operable to:
    store the group list in the communication device.

13. The group list system of claim 8 wherein:
    the user interface system is further operable to receive a contact identifier corresponding with a contact in the contact list, and to receive at least one tag that is related to the contact; and
    the list generator system is further operable to store the contact identifier and the at least one tag as an entry in the tag list.

14. The group list system of claim 8 wherein the tag list is not formatted as defined by the file format standard.

15. A method of dynamically generating a group list for use by a communication device, the method comprising:
    identifying a contact list of a user of the communication device stored at a network based address book;
    generating a tag list corresponding with contacts in the contact list, wherein the tag list is stored at the communication device and identifies at least one tag that relates to a contact in the contact list, wherein the at least one tag comprises an additional attribute of the contact that is not included in the contact list;
    receiving list criteria from the user of the communication device to generate a group list as a sub-group of the contact list;
    filtering out the contacts of the contact list that have tags matching the list criteria as defined in the tag list;
    generating the group list based on the contacts filtered out of the contact list; and
    providing the group list to the user of the communication device.

16. The method of claim 15 further comprising:
    filtering out the contacts of the contact list that have contact information matching the list criteria as defined in the contact list.

17. The method of claim 15 further comprising:
    receiving a group name from the user; and
    storing the group list with the group name.

18. The method of claim 17 wherein the group list is generated by and stored at a network server that hosts the network based address book.

19. The method of claim 17 wherein storing the group list with the group name further comprises:
    storing the group list in the communication device.

20. The method of claim 15 wherein generating a tag list comprises:
    receiving a contact identifier corresponding with a contact in the contact list;
    receiving at least one tag that is related to the contact; and
    storing the contact identifier and the at least one tag as an entry in the tag list.

\* \* \* \* \*

UNITED STATES PATENT AND TRADEMARK OFFICE
CERTIFICATE OF CORRECTION

| | | |
|---|---|---|
| PATENT NO. | : 7,991,424 B2 | |
| APPLICATION NO. | : 12/036714 | |
| DATED | : August 2, 2011 | |
| INVENTOR(S) | : Batni et al. | |

It is certified that error appears in the above-identified patent and that said Letters Patent is hereby corrected as shown below:

In column 7, line 20, the text "such as "CONTACT" in entry" should read -- such as "CONTACT1" in entry --

Signed and Sealed this
Twenty-fifth Day of October, 2011

David J. Kappos
*Director of the United States Patent and Trademark Office*